United States Patent [19]

Wiggins

[11] 4,145,160
[45] Mar. 20, 1979

[54] DOWELING JIG

[76] Inventor: Garfield Wiggins, 162 Burnett Ave., Maplewood, N.J. 07040

[21] Appl. No.: 850,582

[22] Filed: Nov. 11, 1977

[51] Int. Cl.² ............................................. B23B 47/28
[52] U.S. Cl. ............................... 408/103; 408/72 R; 408/109; 408/115 R
[58] Field of Search ................. 408/72 B, 103, 104, 408/107, 108, 109, 115 R, 115 B

[56] References Cited

U.S. PATENT DOCUMENTS

| 2,475,263 | 7/1949 | Staggs | 408/104 |
| 2,497,733 | 2/1950 | Kebour | 408/109 |
| 2,934,979 | 5/1960 | Hartje | 408/103 |
| 3,674,376 | 7/1972 | Silken | 408/115 |

FOREIGN PATENT DOCUMENTS 529014   7/1974   U.S.S.R. ................................ 408/72 B

Primary Examiner—Leonidas Vlachos
Attorney, Agent, or Firm—Richard T. Laughlin

[57] ABSTRACT

A doweling jig requiring minimal adjustment for drilling multiple like-size mating dowel pin holes in workpieces of varying thicknesses, dependent on the configuration of fixed position drill guides or bushings. The jig is generally of channel construction, with reversible clamping for use on double jigs of one or two channels. Each side of a double jig may differ in configuration and size of its fixed position drill guides. Of the many construction methods, two use interchangeable heads containing one or more drill guide configurations. The use of pivotal stop disks at each end of the channel lessens visual alignment.

10 Claims, 9 Drawing Figures

DOWELING JIG

GENERAL BACKGROUND OF THE INVENTION

This invention relates broadly to small and relatively light hand tools for use in carpentry and cabinetry and more particularly to improvements in a doweling jig of the type that is clamped directly to the work and adapted for use with wood or composition board.

In woodworking and similar arts many expedients have been employed for drilling matching dowel pin holes in order to join members with concealed dowel pins so that they present aligned surfaces. Various doweling jigs are disclosed in the prior art such as in U.S. Pat. Nos. 2,522,400; 2,260,784; 3,708,237; 2,583,283 and 2,602,238.

These prior art doweling jigs concern set-up or adjustments that are necessary each time a different thickness of lumber is used.

One prior art jig requires positioning of the selected drill guide in a "V" slot and securing it with a thumbscrew. The sliding unit containing the guide is positioned by alignment of the index line for the guide selected to the proper graduation on a scale to bring the center of the hole at the distance desired from the face side of the wood. The sliding unit is secured with a thumbscrew. The jig is then attached to the workpiece, aligning the center line mark on the jig with a mark indicating the center line of the dowel. The hole is then drilled and the jig repositioned for drilling of the matching hole. The full procedure is repeated when wood is used of another thickness.

Another jig has six embedded drill bushings of various sizes in a turret head that is revolved to where the selected bushing is toward the fixed jaw, and is secured in place by a turret screw. The unit holding the turret head slides on two rods and is positioned to where the dowel hole center is at the distance desired from the face side of the workpiece, and is secured with a thumbscrew. The jig is then attached to the workpiece by aligning the dowel hole center line with a line on the jig; the hole is drilled and jig repositioned for drilling of the matching hole. The full procedure is repeated when another thickness of wood is used.

Another jig needs no adjustment with respect to the thickness of the workpiece as it is constructed with left and right hand threaded screws that simultaneously move locking jaws against the work, centering a steel block with five varied sizes of parallel drill guide holes on any thickness of wood within the capacity of the jaws opening. The jig is attached in proper drilling position for the hole selected; the hole is drilled and jig repositioned for drilling of the matching hole. Aligned face surfaces are attained only when pieces are of an exact thickness.

THE PURPOSE AND OBJECTS OF THE INVENTION

The principal objective of this invention is to provide a jig with fixed position drill guides or bushings for the accurate drilling of multiple, like-size matching dowel pin holes for the joining of wood with concealed dowel pins, with the pieces being precisely positioned and aligned.

Another object of the invention is to provide a jig with means by which it can be quickly, accurately and securely positioned on the workpiece and one requiring minimal visual alignment; with such alignment, when necessary, being done with an end of the jig, which affords excellent visibility with a mark on the edge or face of the workpiece to designate the relative position of the pieces to be joined.

Further objects of the invention are to provide a jig with the means of assuring accurate depth control by use of shaft collars supplied for attachment to specific sized drill bits, to provide a jig with drill guides or bushings slightly larger than the drill bit, to provide a jig of simple construction, economical of manufacture, durable in use and refined in appearance and to provide a jig affordable to the cabinetmaker, carpenter, homecraftsman or novice in the craft.

Figure 1:
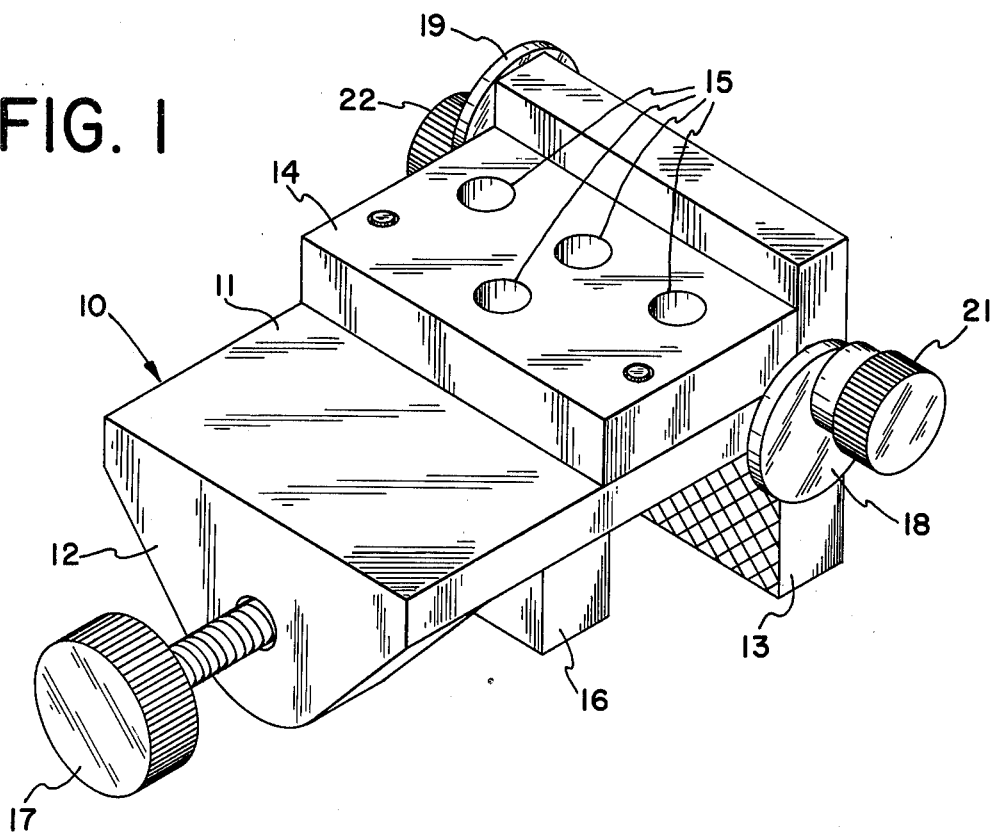
FIG. 1 is an isometric view of one form of the jig of the invention.
Figure 2:
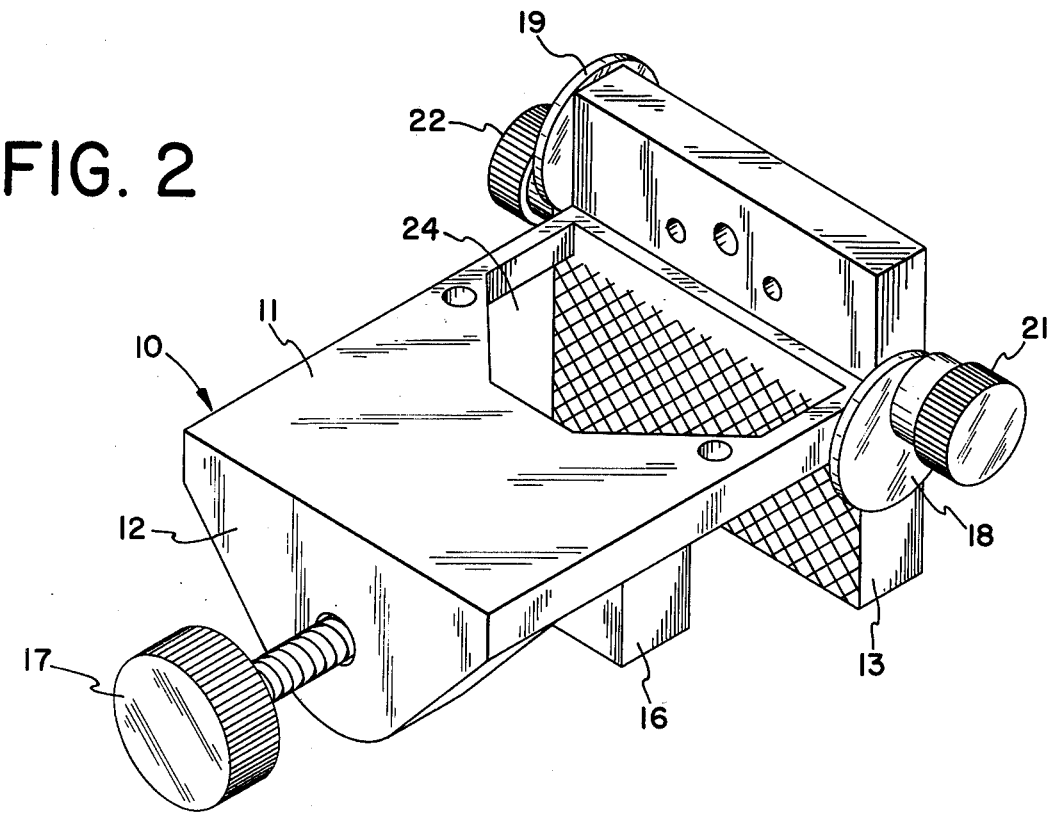
FIG. 2 is similar to FIG. 1 except that the drill head has been removed.

One mode of construction is a jig with interchangeable heads as shown in FIGS. 1 & 2. The interchangeable heads permit with each positioning of the jig, the drilling of aligned holes for doweling a piece of lumber of standard stock thickness. In addition to lumber and plywood, the jig can be used for doweling particle board or any light synthetic materials that would normally be drilled with a portable electric drill. Another advantageous use of the jig is for mortising. This is easily accomplished by inching the jig along a workpiece and drilling through the multiple aligned drill guides to produce overlapping holes for making a mortise of any length.

With an interchangeable head containing one or more offset drill guides, or any jig with this feature, dowel holes may be drilled in a zig-zag pattern. This is particularly advantageous as it strengthens a joint and eliminates any tendency towards twisting. In addition, offset doweling expands the use of the head to other stock of greater thickness. Typically, one drilling configuration is for positioning ¼" dowel pin holes in ½", ⅝", ¾" and 5/4" material.

This invention definitely limits the aligned drill guides adjacent to the work fence to not more than three; in order to confine it to a size considered ideal for doweling either narrow or wide cabinet framing without limiting its use in any way as it can so easily be moved by sliding along an edge of lumber of any length.

One of the essential elements of the invention concerns the fixed positioning of drill guides or bushings with respect to each end of the jig. Each drill guide is an exact distance from the end of the jig nearest to it, as its corresponding guide is from the opposite end. A single offset drill guide is exactly centered between the drill guide at each end, as is the center one in a jig with three aligned drill guides, thus making each end of the jig a point of reference for positioning it on a workpiece.

Positioning of the drill guides in this manner makes the use of a stop on each end practical and desirable.

The stops are considered an important part of the invention as they contribute greatly to efficiency in the precise positioning of the jig on many pieces that would otherwise require visual alignment.

Another essential element of the invention concerns the positioning of drill guides or bushings with respect to the fence, as the jig overlays the workpiece, with the fence against the face. This assures perfect alignment of adjacent face surfaces, as corresponding drill guides are equidistant from the fence. The correct positioning of drill guides leaves a sufficient amount of stock from the guided end, on edges, and between the holes so the wood will not split on insertion of the dowels. The operator determines the holes to be drilled in a workpiece, as consideration must be given to leaving sufficient stock at the end opposite the guiding position.

The stops are disks that move in an eccentric manner by placement of the hole for attachment to the jig in a position close to the edge of disk. This results in an irregular circular movement that allows the disk to act as a stop, and to be revolved or pivoted when not in use for that purpose, to an out-of-the-way position. The jig must always rest squarely on the stock and moving the stop permits it to do so, plus giving full visibility when working to a line on either the face or edge of the work piece.

As shown in the drawings, my improved doweling jig has a horizontally elongated channel generally indicated at 10 with a flat top 11 and two parallel side members 12, 13. The flat top surface is fitted with a drilling plate 14 with a special spaced series of vertical guide drilling holes or bushings generally indicated at 15. The guide bushings allow a drill bit to pass through and drill the required holes in alignment in the stock. It is essential to the invention that the guide holes be spaced in precise relationship to allow utilization of the jig in its most useful manner. Such a configuration will allow a work piece to be inserted in either side of the jig to drill corresponding holes in the work piece. As an illustration in a three hole configuration the center hole is equal distance from each side of the jig. The two other holes are aligned to be equal distance from the end of the jig and each the same distance from its closer side of the jig or the corresponding hole. A clamping means comprising a plate 16 and an adjustment screw 17 passes through one of the side members 12 for clamping the piece of stock to be drilled longitudinally against the opposite side member and the under surface of the top of the channel. Eccentric stop disks are provided at each end of the channel to form a trihedral angle and constituting a stop against which an end or edge of the stock is positioned. The eccentric stops are generally circular plates 18, 19 having a set screw 21, 22 passing through off center for securing the disk to the channel. By loosening the set screw it is possible to rotate the disk so that it is out of position and does not block the channel or interfere with the jig resting squarely on the work piece.

In FIG. 1 the right hand disk is in position and the left hand disk is out of blocking position.

Figure 3:
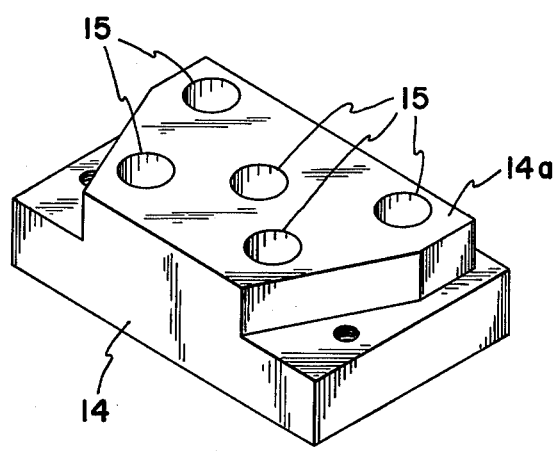
FIG. 3 shows a drill head in reverse configuration for ease of illustration, with various configurations of drilling holes with an extended portion for fitting into the cut out portion of the channel of FIG. 2.

As seen in FIGS. 1 and 3 drilling plates of various configurations of holes can be affixed to the upper surface of the channel by set screws such as of the Allen type. The upper surface of the channel 10 is provided with a cut out section 24 to allow fitting of a corresponding configuration 14a on the plate which extends through section 24 and is flush with the underside of the channel and contacts the stock to be drilled. This configuration improves wood chips clearance generated by the drilling of the holes in the work piece. As shown in FIG. 3, the head has five guides for drilling stock of four different thicknesses with the same head. As a general rule to obtain satisfactory drilling of holes the guide should be not less than twice the diameter of the drill in order to guide it straight.

Figure 4:
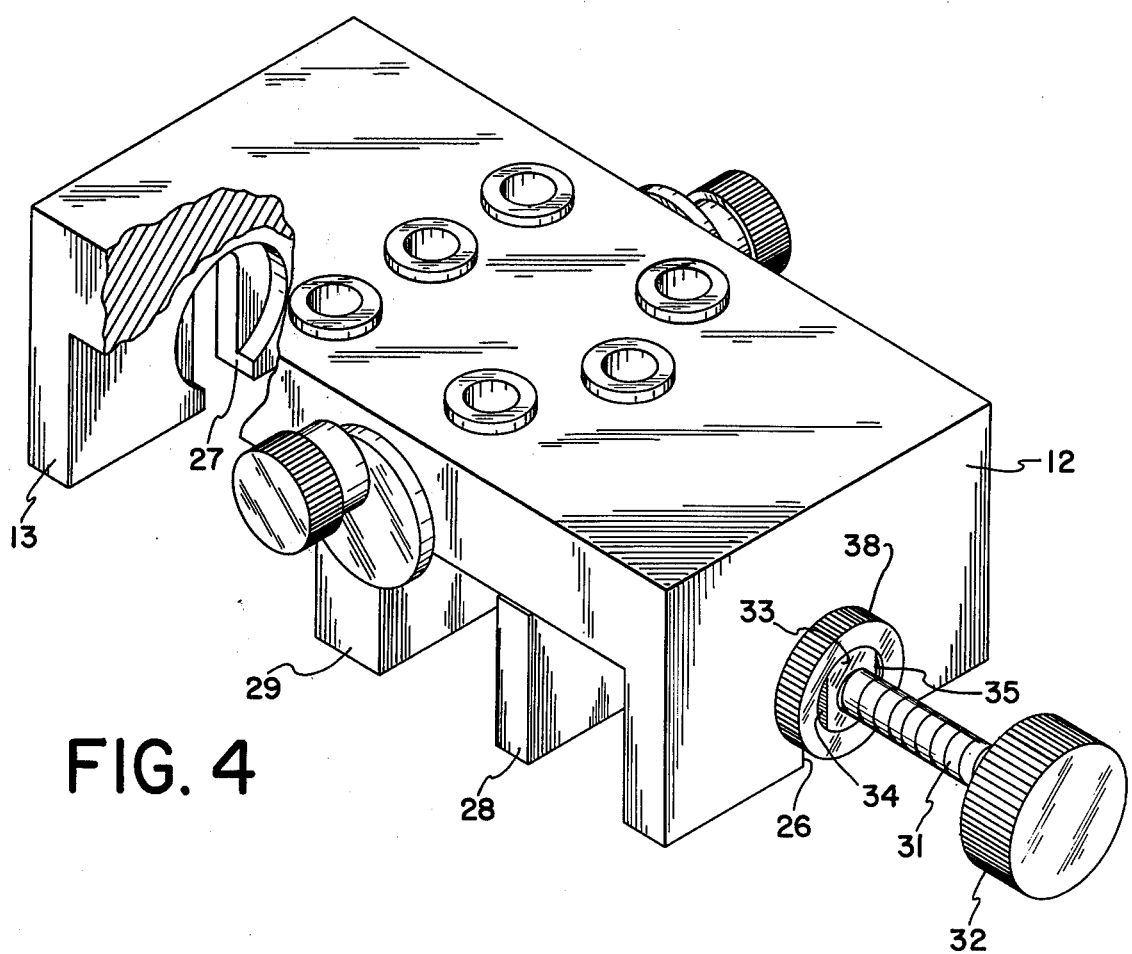
FIG. 4 is a partially sectional isometric view of another form of the dowel jig having a reversible clamping plate and a dual channel.
Figure 5:
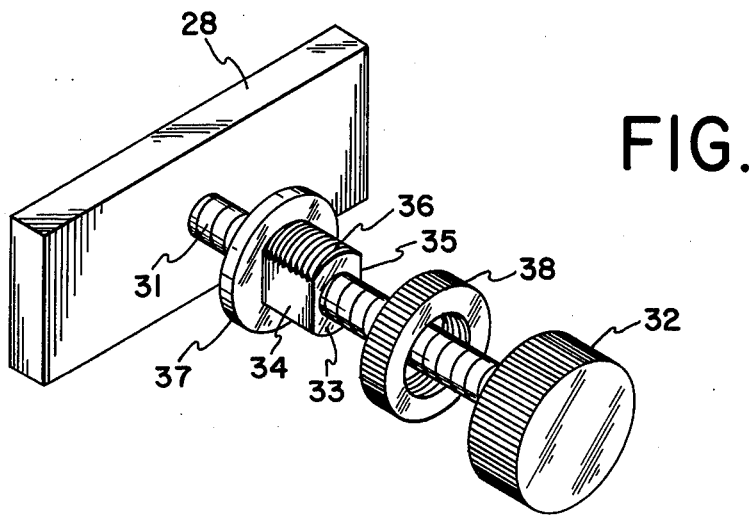
FIG. 5 is an isometric view of the clamping plate of FIG. 4.
Figure 8:
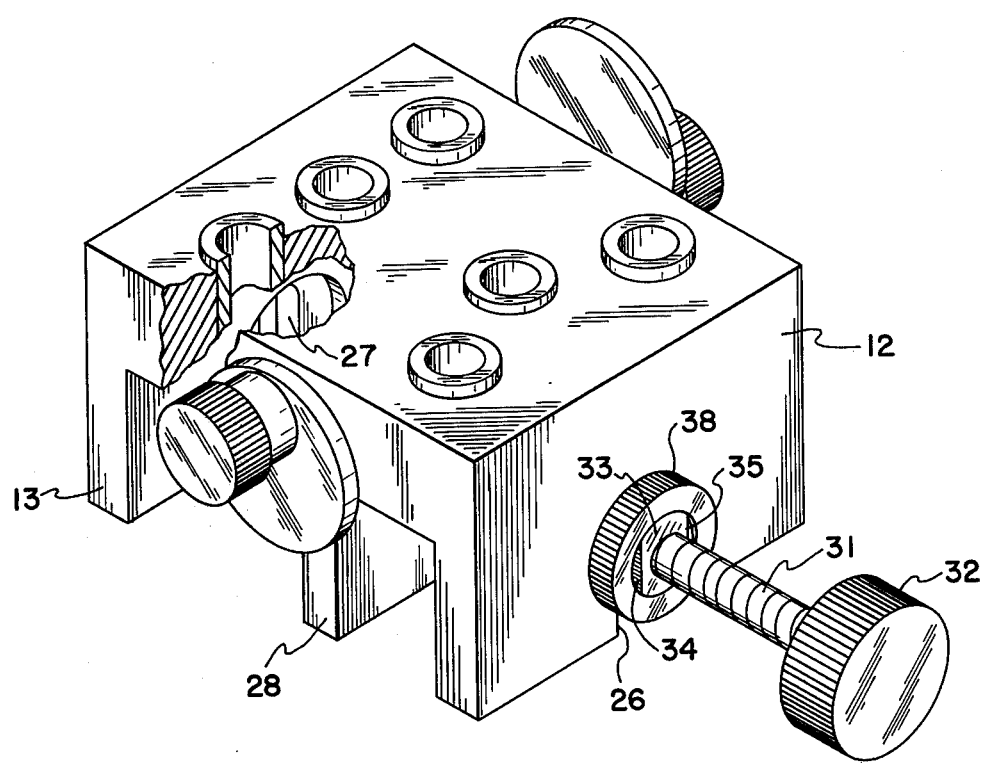
FIG. 8 is a partially sectional isometric view of another form of the invention having a reversible clamping plate, a single channel and a dual head.

The configurations in FIGS. 4 & 8 show the side members 12 & 13 of the channel are provided with slots 26, 27 so that the clamping member generally indicated at 28 and shown in FIG. 5 can be switched from one side to the other for quick reversing of the jig. In a preferred arrangement each slot has a recessed portion to receive stop means 37 for a compact structure. The use of interchangeable heads on the jig shown in FIG. 4 converts it to two different jigs with each change. The modification necessary for a flat plate type of interchangeable head for use on this jig requires openings to be made in the top member of the jig of FIG. 4 to permit passage of two configurations of drill bushings embedded or press fitted in the heads. FIG. 4 shows a center fence 29 in the channel against which the work piece can be clamped. In FIG. 8 the center fence has been removed and the opposite side member is utilized for the clamping surface.

Figure 9:
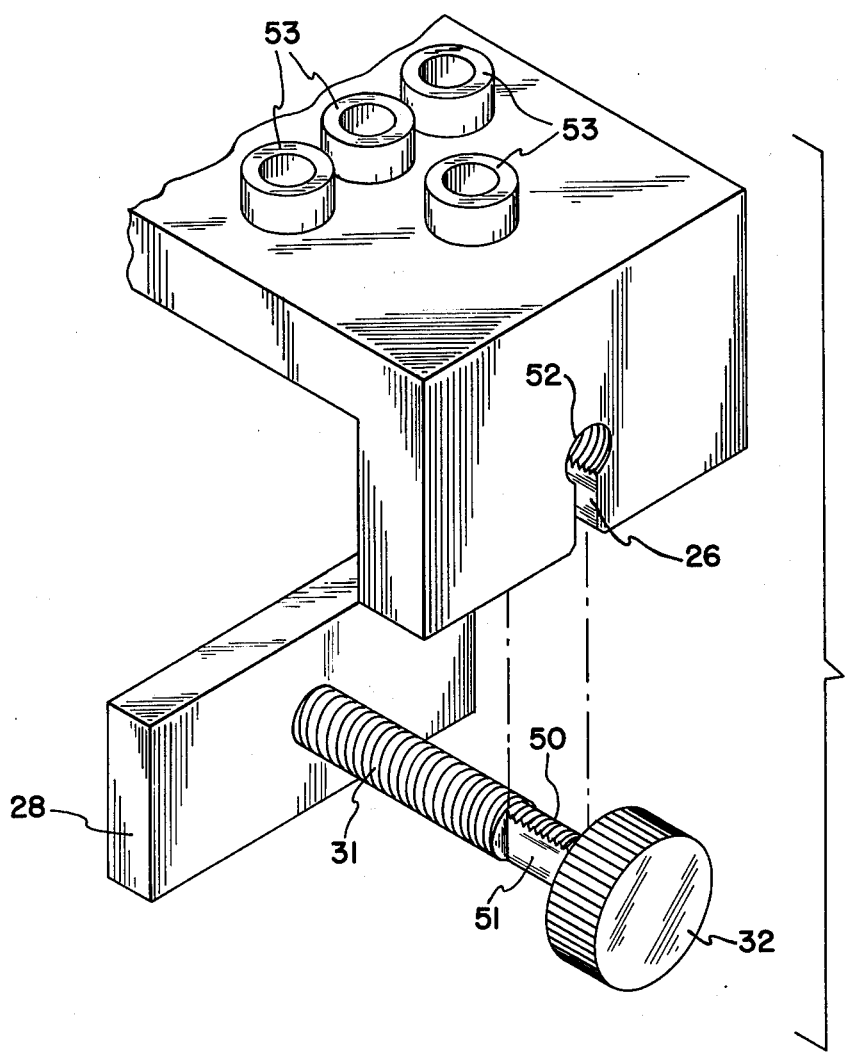
FIG. 9 is an exploded perspective view showing a portion of the dowel jig with a second type of clamping means.

The clamping means shown in FIG. 9 represents a novel arrangement for such clamping. It comprises a pressure plate 28 connected to an adjustment screw 31 with a turning knob 32 on the opposite end. The adjustment screw 31 is made to pass into the slot 26 by means of two parallel flat surfaces 50, 51 cut into the screw preferably adjacent to the knob 32, so that the thickness of the remaining part of the screw at such flat surfaces is such as to allow the screw to slide into the slot. The slot 26 has a top portion 52 which is threaded to receive the adjustment screw 31. In this preferred arrangement, the offset bushing 53 is positioned further from the fence to expand the doweling range to pieces 1½ to 2" in thickness while still retaining the three aligned bushings for doweling pieces ¾" thick. In operation the adjustment screw passes into the slot at the flat parallel surfaces until it reaches the threaded portion. By rotating the adjustment screw it will engage the threaded portion for movement of the pressure plate into or away from engagement with the piece of stock. When the clamping means is to be removed the screw can be turned to align the flat surfaces with the slot and allow the removal of the clamping means from the slot.

The clamping means shown in FIG. 5 represents a novel arrangement for such clamping. It comprises a pressure plate 28 rotatably connected to an adjustment screw 31 with a turning knob 32 made to pass through the slot 26. The screw is fitted with a nut 33 with two flat parallel sides 34 and 35 which fit into the slot 26 thereby preventing turning. The nut is provided with a threaded end 36 which is sufficiently long to extend through the slot. A stop means 37 is secured to the opposite end of said nut which is larger than the width of the slot 26 for pressing against one side of the slot and in conjunction with a second nut 38 larger than the width of the slot 26 for screwing onto the threaded end of the first nut and pressing against the opposite surface of the slot. Adjustment of the two nuts allows tightening the nuts in a rigid configuration with the slot which still allows movement of the adjustment screw 31 and in a loosened position allows the ready removal of the clamping device from the slot for positioning in the opposite slot.

Figure 6:
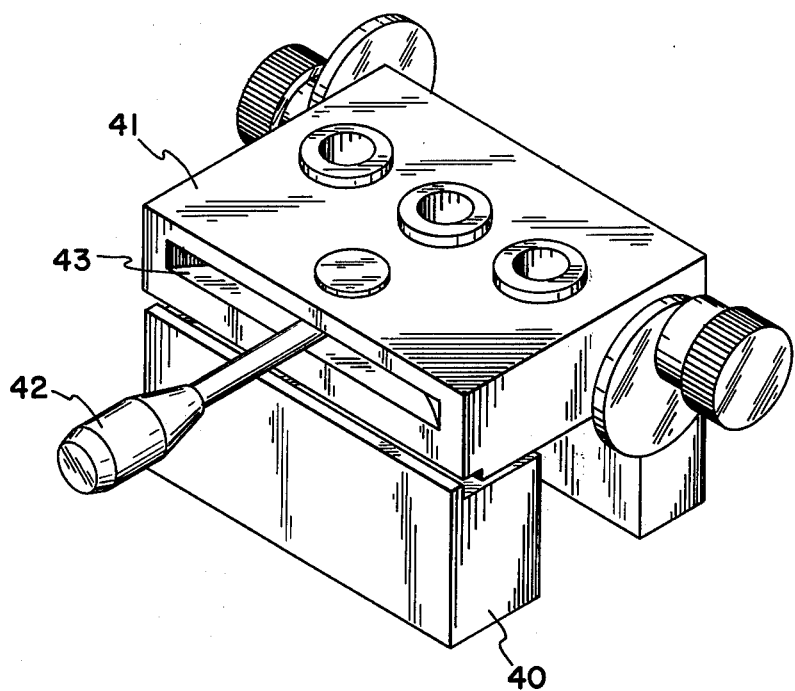
FIG. 6 is an isometric view of a jig having an eccentrically activated clamping plate.
Figure 7:
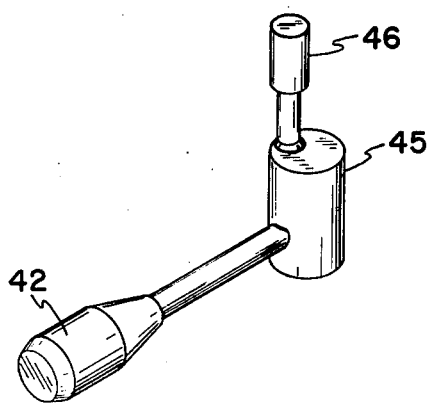
FIG. 7 is an isometric view showing the construction of the eccentric lever for the clamping plate shown in FIG. 6.

FIG. 6 shows a clamping device which has an eccentric. In this modification one side member 40 of the channel 41 is pivotately connected to the channel. A rod 42 fits thru a slot 43 cut in the side of the channel 41 which allows the rod to be moved in one direction to clamp the work piece in the channel formed by the top and the two side members and in the opposite direction to loosen the side member 40 to allow removal of the work piece from the channel. The construction of the eccentric is shown in FIG. 7. It comprises an elongated cylinder 45 with an off-set center pin 46 affixed to one end. The rod 42 is secured at a right angle to the cylinder such as by a threaded end screwing into the cylinder 45. A hole is provided in channel 40 in which the pin 46 fits. When the rod 42 is moved in one direction it allows a tight configuration and a loose fit when moved in the opposite direction. Lack of adjustability limits this clamping method to the one thickness of stock for which it is designed.

The doweling jig of the invention has many advantages. One such advantage is that there is no measuring with respect to the dowel hole positions, it requires no line to line marking to designate dowel hole centers as is customary with many devices of this nature, and the use of which makes possible the principal object of drilling multiple, like size, precisely positioned and matched dowel pin holes; assuring aligned surfaces in materials to be joined by doweling. This ordinarily difficult and time consuming task is made easy, fast and efficient to such an extent that a novice can quickly make doweled joinings of an excellence unsurpassed by the most proficient cabinemaker, regardless of the type of said joinings; whether they are "butt," "mitered at any degree," a "T," or "edge to edge." Excellent visibility and multiple drilling also makes it easier to dowel a "right angle joining", which is an edge joining with a flat surface. It is easily accomplished with the aid of a narrow wood ripping as an accessory; by temporarily securing it to the flat surface in the desired position of joining for the expressed purpose of providing a means of fastening the jig thereto while drilling the dowel pin holes through the ripping to the desired depth in the flat surface. The same ripping can be used in similar joinings and actual drilling through this piece occurs only in its first use.

Other advantages of the invention are as follows: Each positioning of the jig permits drilling of multiple, like-size holes; the number adjacent to the fance being purposely limited to three in order to confine it to a size deemed most appropriate for the cabinetmaker, carpenter, homecraftsman or novice.

The frequently used method of line to line marking of dowel centers and alignment with difficult to see scored lines found on many dowel jigs is eliminated with this invention.

Visual alignment, or alignment by touch is eliminated on any workpiece having an edge or end that can be positioned against a stop.

Precisely matched dowel holes and aligned surfaces are assured if jig is properly positioned on each piece and corresponding drill guides are used for drilling of holes.

Full visibility with an end of the jig to a line on either face or edge of workpiece is attained by revolving the stop disk to an out-of-the-way position; a necessity on joinings such as edge to edge, mitered, and the cross member of a "T."

A joining is made stronger and any tendency towards twisting is eliminated by zigzag doweling with a jig having an offset drill guide or one with an interchangeable head with this feature.

Labor saving is inestimable due to this simplification of doweling, as is material savings of pieces that ordinarily would not be joined.

Further, the jig can have a clamping device which can be shifted to the opposite side so that there can be two jigs in the same unit.

The method of using the jig of the invention is as follows: attach a depth control collar on bit before drilling. The jig must rest squarely on the work. Overlay the jig on the work, with the fence against the face; taking care that it is properly positioned for drilling holes in the edge or end as desired. Dowel holes are always at right angles to the contacting surfaces which are to be joined. Each joining consists of a right and left-hand member, and doweling involves the use of each end of the jig for its positioning. Work lines are necessary on either face or edge of joinings such as "edge to edge, " "mitered," and the cross member of a "T." An identifying mark on the face of the work at the common point of every joining, and on the edge or end to be drilled saves time as it facilitates correct attachment of the jig. A stop may be used for positioning the jig on each piece of a corner butt joint. The most confined areas for dowel holes are the ends of narrow pieces. If they are drilled first, the drill guide or guides to use in the opposite member becomes apparent. The order for drilling is of no significance provided the holes match, dowels are concealed, and sufficient stock is left opposite the guiding end of the jig. Correct usage results in mated holes and aligned surfaces and can be attained by using the jig with the fence against the face of the work.

The jig of this invention can be made in a number of different ways. The one with eccentric clamping lends itself to plastic injection molding or die casting in either aluminum or an alloy metal, either of which would have embedded drill bushings. The eccentric piece would be in steel and produced by screw machine. The leverage arm would probably be a casting. The preferred method for the basic structure of the jig with interchangeable heads is die casting. Heads, with embedded drill bushings can be cast or molded separately or bushings can be press fitted in the heads. The heads with drill guide holes can be produced by "the lost wax" method in investment casting. The latted is done by making a replica of the steel heads, such as the machined ones.

Drill bushings in jigs, or in interchangeable heads, will protrude above the surface so as to prevent wearing of the materials into which they are embedded, or press fitted. There are no adjustments on jigs constructed under the principles of this invention. If the jig in use has a head with an offset drill guide or guides, a change in set-up may not be necessary as each head with this feature will accommodate a minimum of two thicknesses of lumber; with one of the heads accommodating four thicknesses. However, if a head with drill guides of another size, or one without the offset feature is desired, a change of heads is necessary. The heads are secured to the basic structure with allen screws. After a head is changed, the jig is properly positioned on one of the workpieces, holes are drilled, and jig repositioned for drilling of matching holes.

Doweling jigs constructed according to the principles of this invention are primarily for edge or end drilling. However, a right angle joining of an edge to a flat surface is easily accomplished by clamping the jig to a narrow wood ripping temporarily secured to the flat surface in the desired position of joining and drilling through it. Aligned holes in the edge of the joining piece are assured by using the jig in the same relative position.

Any departure from the foregoing description which conforms to the present invention is intended to be included within the scope of the claims.

What is claimed is:

1. In a dowel jig for use in drilling matching holes in two separate pieces of stock, the combination of a horizontally elongated channel having a flat top and two parallel side members, said top member having an undersurface parallel with its upper surface and having a longitudinally spaced series of vertical guide bushings through which a drill bit can pass for making spaced holes in the piece of stock held in contact with said undersurface, one of said side members having attached means for clamping the piece of stock longitudinally against the other side member and said undersurface in a position for drilling operation thereon, an eccentric stop disk at each end of said channel to form a trihedral angle and constituting a stop against which the end or the edge of the stock is positioned thereto, each of said stops being pivotal to move out of such stop position.

2. The dowel jig of claim 1, wherein said channel contains a spacer fence dividing the channel into a first channel and a second channel, each of said first and second channels having a longitudinally spaced series of vertical guide bushings and said clamping means is reversible to allow clamping the piece of stock longitudinally against either side of said spacer fence.

3. The dowel jig of claim 1 wherein said channel contains a spacer fence dividing the channel into a first channel and a second channel, each of said first and second channels having a longitudinally spaced series of vertical guide bushings, said clamping means being reversible to allow clamping the piece of stock longitudinally against either side of said spacer fence, said clamping means fits into an open ended slot in the lower surface of each of said side members and said clamping means comprises a pressure plate rotatably connected to an adjustment screw passing through said slot, said screw having a nut with two flat parallel sides which fit into said slot and a threaded end, a stop means secured to said nut opposite to said threaded end for pressing against one side of said slotted side member and a second nut for pressing against the opposite surface of said side member when screwed onto said threaded end of said first nut thereby firmly clamping said adjustment screw into said slot without interfering with the lateral movement of the adjustment screw against said pressure plate for securing the piece of stock in drilling position.

4. The dowel jig of claim 1 wherein said top of said channel is provided with a large opening and said guide bushings are located in a seperate plate removable affixed over said opening so that the drill bit passes through said opening.

5. The dowel jig of claim 1 wherein said top member has two sets of longitudinally spaced vertical guide bushings through which a drill bit can pass for making spaced holes in the piece of stock held in contact with said undersurface, each set of guide bushings being located at opposite ends of said top member, and said clamping means is reversible to allow clamping the piece of stock longitudinally against the opposite side member, said clamping means fits into an open ended slot in the lower surface of each of said side members and comprises a pressure plate connected to an adjustment screw having a nut with two flat parallel sides which fit into said slot and a threaded end, a stop means secured to said nut opposite to said threaded end for pressing against one side of said slotted side member and a second nut for pressing against the opposite surface of said side member when screwed onto said threaded end of said first nut thereby firmly clamping said adjustment screw into said slot without interfering with the lateral movement of the adjustment screw against said pressure plate for securing the piece of stock in drilling position.

6. The dowel jig of claim 1 wherein said guide bushings are located in a seperate head removable affixed to said channel to permit the use of interchangable heads.

7. The dowel jig of claim 1, wherein one of said side members is pivotately connected to said undersurface of the flat top of said channel to form said clamping means when in its aligned position to form said channel, said side member being moved into said clamping position by the action of an eccentric activating means.

8. The dowel jig of claim 1, wherein at least one of said side members contains an open ended slot having a threaded portion at the closed end of said slot and said clamping means comprises a pressure plate affixed to an adjustment screw having two parallel flat surfaces which allows passage of said screw into said slot and in engagement with said threaded portion to allow movement of said pressure plate against the piece of stock by rotation of said screw in one direction and release of the stock when rotated in the opposite direction.

9. The dowel jig of claim 1, wherein said vertical guide bushings are aligned parallel to one of said side members and are two in number, each guide bushing being spaced the same distance from its corresponding open end of said channel as the other guide bushing.

10. The dowel jig of claim 9, wherein a third bushing is spaced equal distance from each open end of said channel.

* * * * *